United States Patent [19]

Marr et al.

[11] Patent Number: 4,503,015

[45] Date of Patent: Mar. 5, 1985

[54] METHOD OF REMOVING ARSENIC FROM A COPPER ELECTROLYTE

[75] Inventors: Rolf Marr; Hans-Jörg Bart, both of Graz; Reinhard Wachter, Braunau, all of Austria

[73] Assignee: Vereinigte Metallwerke Ranshofen-Berndorf AG, Braunau am Inn, Austria

[21] Appl. No.: 543,122

[22] Filed: Oct. 18, 1983

[30] Foreign Application Priority Data

Oct. 19, 1982 [AT] Austria .............................. 3841/82
Jul. 20, 1983 [AT] Austria .............................. 2656/83

[51] Int. Cl.³ ...................... C01B 27/00; C01B 29/00
[52] U.S. Cl. ........................................ 423/24; 423/87
[58] Field of Search .................................. 423/87, 24

[56] References Cited

U.S. PATENT DOCUMENTS 4,061,564 12/1977 De Schepper et al. .............. 423/87
4,102,976 7/1978 Hiemeleers et al. .................. 423/87

FOREIGN PATENT DOCUMENTS 1551023 8/1979 United Kingdom .

OTHER PUBLICATIONS

Pp. 197 and 213 of Ullmans Encyklopadie der Technischen Chemie, 3rd Edition, (Urban & Schwarzenberg, München, Berlin, 1961)–in German.

Primary Examiner—John Doll
Assistant Examiner—Wayne A. Langel
Attorney, Agent, or Firm—Karl F. Ross

[57] ABSTRACT

A copper electrowinning electrolyte containing arsenic is extracted to remove arsenic therefrom utilizing trioctylphosphinicoxide as an extracting agent in an organic solvent.

11 Claims, 1 Drawing Figure

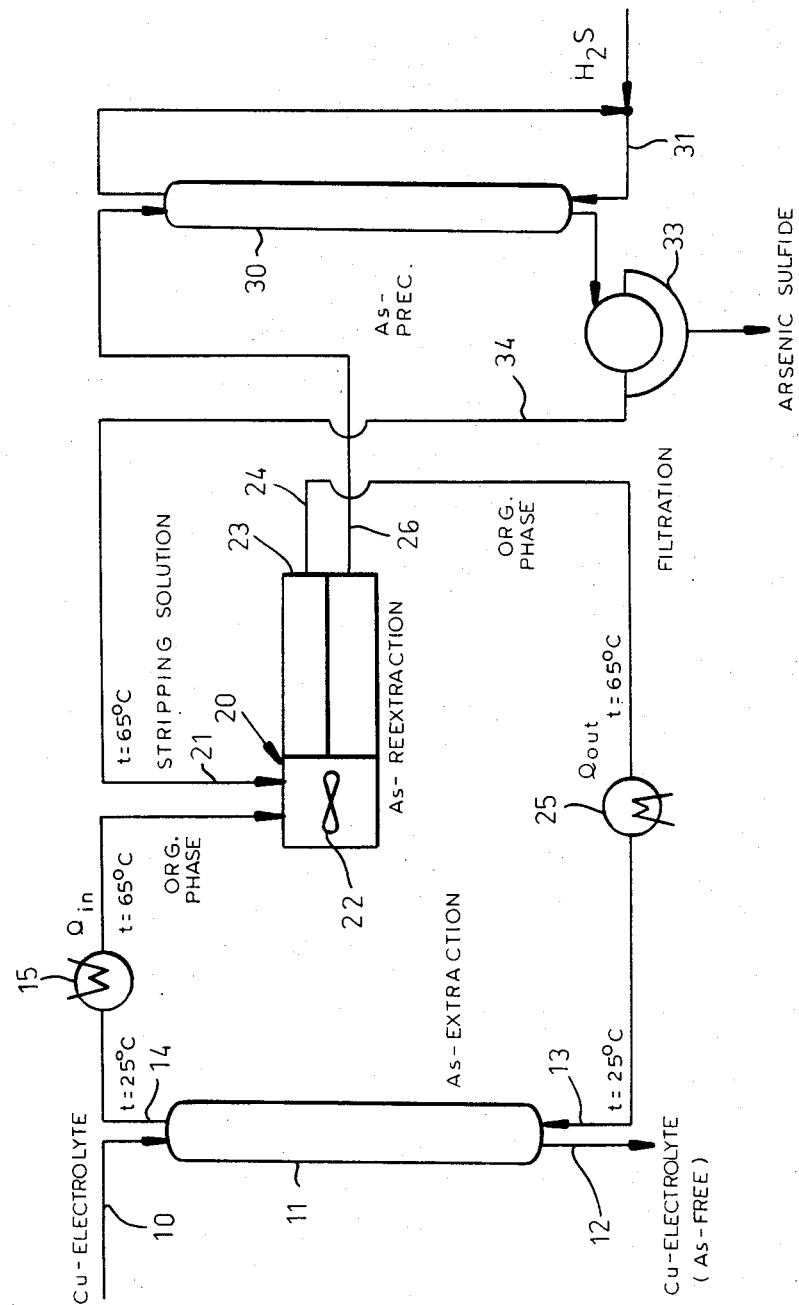

METHOD OF REMOVING ARSENIC FROM A COPPER ELECTROLYTE

FIELD OF THE INVENTION

Our present invention relates to a method of removing arsenic from a copper electrolyte and, more particularly, to a method of treating a copper electrowinning electrolyte so as to extract arsenic therefrom.

BACKGROUND OF THE INVENTION

In the electrowinning of copper, electrolytes are utilized in which the arsenic content tends to increase with time. A copper electrowinning electrolyte can contain, for example, high arsenic contents of as much as 8 grams per liter of arsenic.

The arsenic in the copper electrowinning electrolyte poses some significant problems. Firstly, the arsenic tends to precipitate upon the inert lead anodes which are used in the process.

In addition, there is a tendency toward arsine formation with its significant environmental hazard.

It has been proposed to remove arsenic from electrowinning electrolyte after the electrodeposition of copper and nickel therefrom by the formation of an arsenic precipitate, leaving the resulting sulfuric acid solution substantially free from the arsenic. Such processes, however, are disadvantageous, in that the treatment used to precipitate the arsenic at high arsenic concentrations in the copper electrolyte can result in the formation of the toxic arsine gas (see Ullmanns Encyklopadie der Technischen Chemie, 3. Auflage, Urban & Schwarzenberg, Munchen, Berlin, 1961, pages 213 and 197).

To avoid these problems it has been proposed, for example in British Pat. No. 1,551,023, to remove the arsenic from the copper electrowinning electrolyte by an extraction process utilizing an organic solvent. The extracting agent proposed in this patent is tributylphosphate (TBP) a compound which, when present in an amount of 50% by weight in the organic extraction phase, is able to recover say 4.5% of the arsenic from a copper electrowinning electrolyte. The process uses liquid/liquid extraction and the arsenic can be recovered by treating the extraction mixture with an aqueous solution.

While the extraction process has proved to be a marked improvement over earlier methods of removing arsenic from such electrolytes, the low recovery of arsenic has left much to be desired.

OBJECTS OF THE INVENTION

It is the principal object of our present invention to provide an improved method of removing arsenic from a copper electrowinning electrolyte and especially an electrowinning electrolyte having a high arsenic concentration, whereby the disadvantages of earlier methods can be avoided.

Another object of the invention is to provide a method of removing arsenic from a copper electrowinning electrolyte whereby the danger of arsine formation is minimized or eliminated and arsenic can be recovered significantly more efficiently and completely than in earlier systems.

Still another object of this invention is to provide an improved process for the removal of arsenic from a sulfuric acid electrolyte of the type described whereby the degree of extraction can be vastly improved over that obtained in earlier extraction processes, e.g. the extraction process of the British patent mentioned above.

SUMMARY OF THE INVENTION

These objects and others which will become apparent hereinafter are attained, in accordance with the present invention by, the use of an extraction process in which the extraction agent is trioctylphosphinicoxide (TOPO), an extracting agent which we have found, most surprisingly because it is an organophosphorus compound like the TBP previously proposed, can be 10 or more times more effective in the recovery of arsenic.

For example, utilizing identical organic vehicles with 50% by weight TBP, the arsenic recovery from a copper electrowinning electrolyte is 4.5% whereas with 50% by weight TOPO in the same organic extraction phase with the identical electrolyte under identical extraction conditions, 68% arsenic recovery is obtained.

According to the invention, therefore, an extraction agent is used which consists of an organic phase containing 0.1 to 2.6 moles of trioctylphosphinicoxide per kg of the extraction mixture, and the extraction mixture is brought into liquid/liquid extraction relationship with the copper electrowinning electrolyte containing arsenic.

The organic extraction medium utilized in the test described above was an aromatic mixture marketed as Shellsol AB and was used in equal volume with the copper electrowinning electrolyte which consisted of an aqueous solution of 28.3 grams per liter copper, 187.2 grams sulfuric acid, 18 grams per liter nickel, 2.3 grams arsenic, 0.13 grams per liter iron, 0.2 grams per liter calcium, 0.03 grams per liter magnesium, 0.9 grams per liter sodium, and 0.033 grams per liter chloride. The extraction was carried out at 20° C.

Surprisingly, when a similar test was made with kerosene, the differences were meager although the total still gave better results than the TBP.

The use of TOPO as the extraction agent permits a considerable saving in equipment to be realized. It allows the number of extraction steps to be reduced for a given degree of arsenic recovery and thus also minimizes the amount of the organic medium required.

Indeed, because of the high degree of arsenic recovery it is possible to practically completely free the copper electrowinning electrolyte from arsenic and thus enable the electrolyte to be recycled to copper or nickel electrowinning processes.

The organic phase of the extracting medium can utilize an inert organic solvent or diluent for the trioctylphosphinicoxide, this solvent or diluent being characterized by insolubility in or to water, the fact that the trioctylphosphinioxide is soluble therein, and also freedom from any tendency to limit the arsenic extraction.

Best results are obtained with aromatic, aliphatic and halogenated hydrocarbon and petroleum derivatives and especially the aromatic hydrocarbons. The specific hydrocarbons which are preferred are toluene, carbon tetrachloride and kerosene, with by far the best results being obtained with aromatic mixtures having a boiling point range between 186° and 215° C., a density of 0.9 grams per ml and a viscosity of 1.20 centistokes. Such an aromatic hydrocarbon mixture is the Shellsol AB mentioned previously.

The arsenic-containing aqueous solution is treated with the extracting medium in liquid/liquid extraction utilizing conventional techniques. A continuous counterflow method using mixture and separators in combination, or columns, is preferred.

The extraction temperature can be relatively low and can have a room temperature of approximately 25° C. and, if a temperature range is to be named, should be between 15° and 42° C.

The final concentration of arsenic in the aqueous phase will, of course, depend upon the number of mixing-stroke separating stages or the column height and the number of plates of the column. The volumetric ratio of the organic phase to the aqueous phase during extraction can be varied over a wide range. For example, the ratio of organic to aqueous phases can be 10:1 to 1:10 with a preferred range of 5:1 to 1:5 and a still narrower range of 2.5:1 to 1:2.5 being still more preferable. The precise ratio will depend, of course, upon the composition of the organic solvent and the arsenic content of the copper electrowinning electrolyte.

Equal parts by volume of the organic and liquid phases have been found to be effective.

After the arsenic has been extracted into the organic phase, the aqueous and organic phases are separated, in accordance with the invention and the organic extraction phase can be back extracted in liquid/liquid extraction to remove the arsenic therefrom. In this case, the organic phase is treated with a stripping solution which can be a low concentration salt and/or mineral acid aqueous solution containing, for example, 0.5 mole per liter of salt. The back extraction or stripping can be carried out at a higher temperature, for example 65° C. plus or minus 10° C. to remove the arsenic. The arsenic can be precipitated or otherwise recovered from the aqueous stripping solution by any conventional means.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the invention.

SPECIFIC DESCRIPTION

As will be apparent from the drawing, a copper electrowinning electrolyte is introduced at 10 to a counter current liquid/liquid extraction column 11 and the arsenic-free copper electrolyte is recovered at 12.

In counterflow to the electrolyte through the columns, an extraction solution is introduced at a temperature of 25° C. at 13 and the organic phase is recovered at 14.

After heating at 15, the organic phase can be subjected to a re-extraction or reverse extraction in a mixing/separating unit 20 in which the organic phase is subjected to intimate contact with a scrubbing liquid introduced at 21. The mixing stage is represented at 22 and the separating stage at 23. The organic phase, which is recovered at the top and is decanted from the separating stage, is removed at 24 and, after cooling in the heat exchanger 25, is supplied to line 13 at the lower temperature of extraction.

The aqueous phase, now containing the arsenic, is withdrawn at 26 and is delivered to a precipitating column 30 in which the aqueous phase is contacted with hydrogen sulfide which is recycled as represented by the line 31. The arsenic sulfide precipitate is recovered in a liquid/solid separator 33 and the salt/acid solution is recycled as the stripping solution via line 34.

SPECIFIC EXAMPLES

Example I

An extraction organic phase is formed by dissolving 80% by weight of trioctylphosphinicoxide in paraxylene. This solution is brought into liquid/liquid extraction contact with a sulfuric acid copper electrowinning electrolyte containing 2.3 grams per liter of arsenic in a contacting system consisting of three mixing-separator stages operating in counter flow. The phase ratio of organic phase to aqueous phase is 1:1 by volume. The arsenic level is reduced to 0.3 grams per liter and 2.1 grams per liter of arsenic is found in the organic phase.

After extraction is complete, the organic phase is heated to a temperature of 65° C. and is stripped with an aqueous solution of 0.5 moles per liter $Na_2SO_4$ which also contains 10% $H_2SO_4$. The stripping solution has previously been heated to 65° C. also. The stripping operation is carried out in a single stage mixing-separating contactor and the organic phase arsenic content is reduced to 0.1 grams per liter. The organic medium from the latter separator is cooled to 25° C. and recycled to the extraction.

The stripping solution is treated with oxygen sulfide and the arsenic precipitated as the sulfide therefrom. The solution can then be recycled to the stripping unit. Where recycling is carried out, both of the organic phase and of the stripping liquid, replacement liquid is supplied appropriately to make up any losses.

Example II 20.7 moles per kg of trioctylphosphinicoxide in Shellsol T, an aliphatic hydrocarbon mixture, is used in liquid/liquid extraction of a copper electrowinning electrolyte containing 2.35 grams per liter arsenic in counterflow through a SHE extraction column of the type described in Austrian patent No. 4568/8. The effective column height was about 3 meters. The organic:aqueous volumetric ratio was 1:1.5. The aqueous phase leaving the column contains 0.17 grams per liter arsenic and after a residence time of the dispersed organic droplets in the column of 12 minutes at about room temperature, the organic phase was recovered and contained all of the rest of the arsenic and was stripped in the manner described.

Example III

A 50% by weight solution of TOPO in Shellsol AB was used to extract the copper electrolyte previously described containing 28.3 grams per liter copper, 187.2 grams per liter sulfuric acid, 18 grams per liter nickel, 2.3 grams per liter arsenic, 0.13 grams per liter iron, 0.2 grams per liter calcium, 0.03 grams per liter magnesium, 0.9 grams per liter sodium and 0.033 grams per liter chloride at 25° C. Equal volumes of the extracting medium and the electrolyte were contacted with one another in a column of the type described in Example II. The organic phase was found to contain 1.56 grams per liter of arsenic, leaving 0.74 grams per liter in the aqueous phase. Shellsol AB is an aromatic hydrocarbon mixture having a boiling point range of 186° to 215° C., a density of 0.9 grams per ml, a viscosity of 120 centistokes, a flashpoint of 68° C., a Kauri-butanol value of 91 as measured by ASTM standard D1133, an aniline point of 16.1° C. as measured by ASTM standard D611, a Saybolt color of less than +30 as measured by ASTM standard D1500, a copper strip test of 1 as measured by ASTM standard D156, a refractive index at 20° of 1.512 as measured by ASTM standard D1218, and a composition is less than 100 milligrams per kg benzene, 99.5% total aromatics and less than 5 milligrams per kg sulfur.

We claim:

1. A method of removing arsenic from a copper-containing aqueous electrowinning electrolyte containing same, comprising the step of extracting said electrolyte with an extracting medium consisting of 0.1 to 2.6 moles of trioctylphosphinicoxide per kg in an organic solvent.

2. The method defined in claim 1 wherein said organic solvent is an aromatic, aliphatic or chloronated hydrocarbon or a mixture thereof.

3. The method defined in claim 2 wherein said solvent is an aromatic organic solvent.

4. The method defined in claim 1, further comprising the step of stripping the organic extracting medium with a salt and/or mineral acid solution at a temperature of about 65° C.

5. The method defined in claim 4 wherein the stripping solution is a solution of 0.5 moles per liter of sodium sulfate in 10% sulfuric acid.

6. The method defined in claim 3, further comprising the step of stripping the organic extracting medium with a salt and/or mineral acid solution at a temperature of about 65° C.

7. The method defined in claim 6 wherein the stripping solution is a solution of 0.5 moles per liter of sodium sulfate in 10% sulfuric acid.

8. The method defined in claim 1 wherein the organic medium has a temperature during the extraction of about 25° C.

9. The method defined in claim 3 wherein the organic medium has a temperature during the extraction of about 25° C.

10. The method defined in claim 7 wherein the organic medium has a temperature during the extraction of about 25° C.

11. The method defined in claim 8 wherein said solvent is an aromatic pertroleum distillate having a boiling point range of 186° to 214° C., a density of about 0.9 grams/ml, a viscosity of about 120 centistokes, a flashpoint of about 68° C. and a refraction index of about 1.512.

* * * * *